United States Patent Office 3,563,979
Patented Feb. 16, 1971

3,563,979
1,2,3,4,5,6 - HEXAHYDROAZEPINO[4,3 - b]IN-
DOLES AND 1,2,3,4,5,6-HEXAHYDROAZE-
PINO[3,2-b]INDOLES
Jackson B. Hester, Jr., Portage, Mich., assignor to The
Upjohn Company, Kalamazoo, Mich., a corporation
of Delaware
No Drawing. Filed Oct. 21, 1966, Ser. No. 588,315
Int. Cl. C07d 41/08
U.S. Cl. 260—239.3
11 Claims

ABSTRACT OF THE DISCLOSURE 1, 2, 3, 4, 5, 6-hexahydroazepino[4,3-b] indoles, 1,2,3,4,
5,6-hexahydroazepino[3,2-b]indoles and the correspond-
ing acid addition salts thereof are disclosed. These com-
pounds are useful for reducing anxiety and fighting be-
havior in animals and also for normalizing hyperactive
and depressed mental states.

This invention is directed to azepinoindoles.
The compounds contemplated herein are 1,2,3,4,5,6-
hexahydroazepino[4,3-b] indoles represented by the
formula I
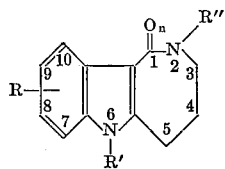

and 1,2,3,4,5,6-hexahydroazepino[3,2-b] indoles repre-
sented by the formula

II
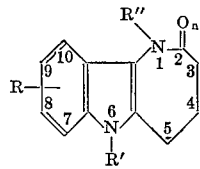

In the foregoing structural formulas, R can be a hy-
drogen, alkyl, alkoxy, or halo radical, R' can be a hydrogen
or alkyl radical, R" can be a hydrogen, alkyl, or alkanoyl
radical, and $n$ can be an integer having a value of zero or
1, with the proviso that when $n$ is 1, R' and R" are hy-
drogen. The foregoing alkyl, alkoxy, and alkanoyl radicals
can contain from 1 to 3 carbon atoms, inclusive.
Thus illustrative alkyl radicals are methyl, ethyl, propyl,
and isopropyl; illustrative alkoxy radicals are methoxy,
ethoxy, propoxy, and isopropoxy; illustrative alkanoyl
radicals are formyl, acetyl, and propionyl; and illustrative
halo radicals are fluoro, chloro, and bromo.
Also contemplated within the purview of the present
invention are the acid addition salts of those afore-
described compounds which are amines, i.e., compounds
of Formulas I and II in which $n$ is zero and R" is hydrogen
or alkyl. Stable acid addition salts can be formed with
acids such as hydrochloric, hydrobromic, sulfuric, phos-
phoric, nitric, acetic, benzoic, salicylic, glycolic, succinic,
niotinic, tartaric, maleic, malic, lactic, pamoic, methane-
sulfonic, picric, cyclohexanesulfamic, lactic, and the like.
The overall reaction scheme for the preparation of the
compounds of this invention is graphically set forth below,
with R having the same meaning as before, R''' represent-
ing an alkyl radical, Tos representing a toluenesulfonyl
radical, and X representing halogen:

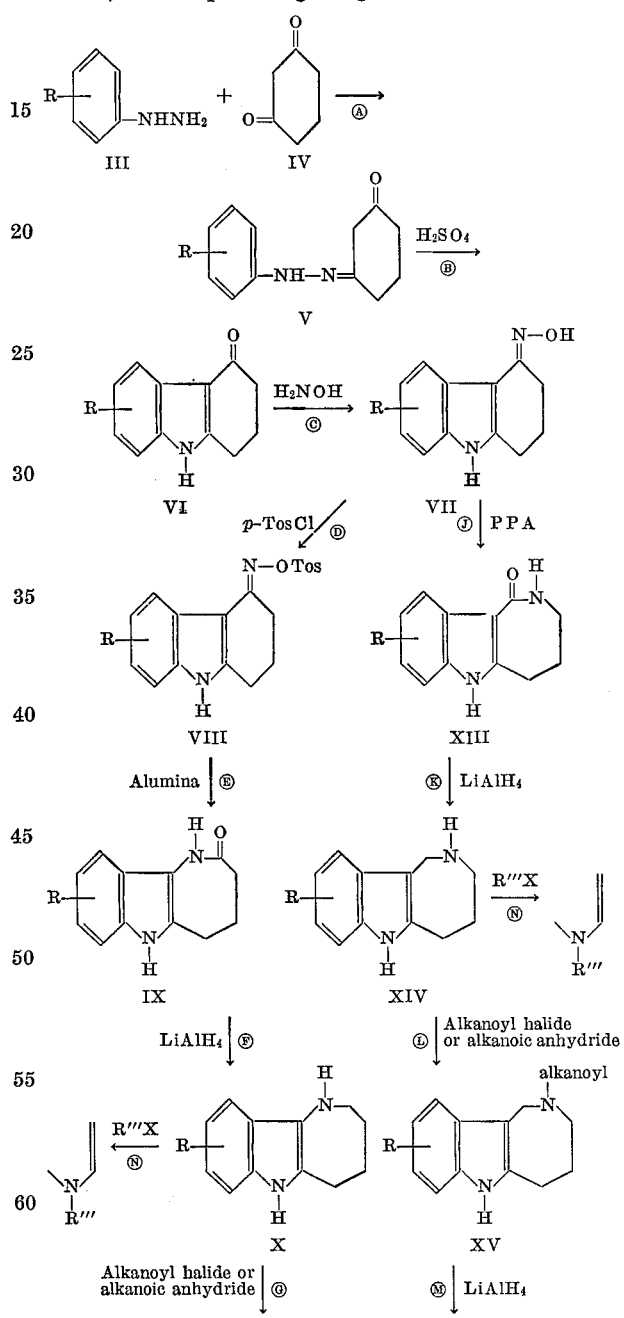

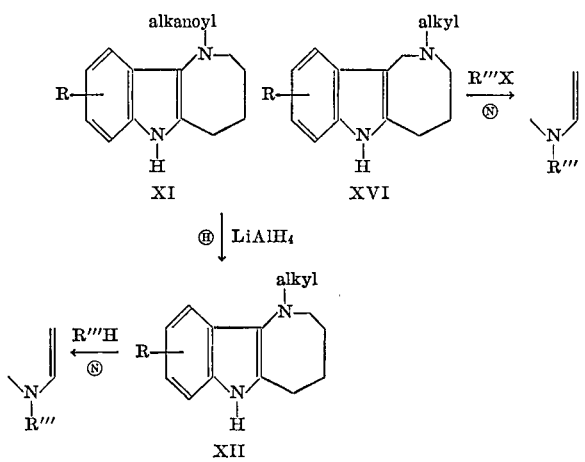

The compounds of this invention can be prepared by first reacting a substituted or unsubstituted phenylhydrazine (III) with 1,3-cyclohexanedione (IV). The reaction can be conveniently carried out by adding, with agitation, an aqueous or ethanolic solution of the desired phenylhydrazine to an aqueous solution of 1,3-cyclohexanedione at a temperature in the range from about 0° C. to about 50° C., and preferably from about 20° C. to about 30° C. so as to produce the corresponding 3-(phenylhydrazono) cyclohexanone (V). The reaction time usually ranges from about 30 minutes to about 120 minutes, and preferably from about 50 minutes to about 70 minutes. (Step A.) The foregoing preparation is exemplified by Merling, Ann., 278, 20 (1894).

Thereafter, the product from Step A can be heated to a temperature in the range from about 75° C. to about 125° C., preferably at about 100° C., in the presence of an acid catalyst such as dilute (about 30 weight percent) aqueous sulfuric acid, ethanolic hydrogen chloride, and the like, for about 1 to about 5 hours, preferably for about 1.5 hours, so as to produce a 1,2,3,4-tetrahydrocarbazol-4-one (VI). (Step B.) The above procedure is exemplified by Clemo et al., J. Chem. Soc., 700 (1951).

The ketone VI produced in Step B can be dissolved in an aqueous solvent such as ethanol-water, or the like, and refluxed together with hydroxylamine for a time period of from about 5 to about 10 hours and in an inert atmosphere such as nitrogen, argon, or the like, to produce the corresponding 1,2,3,4-tetrahydrocarbazol-4-one oxime (VII). (Step C.)

At this particular stage in the overall process sequence, the choice of the reactants determines whether a hexahydroazepino[4,3-b]indole or a hexahydroazepino[3,2-b]indole is produced as the ultimate end product.

In order to produce a hexahydroazepino[3,2-b]indole, the oxime VII obtained in Step C can be reacted with p-toluenesulfonyl chloride in a suitable solvent such as pyridine or the like. The reaction can be carried out at a temperature in the range from about 0° C. to about 25° C., preferably at about 25° C., for a time period in the range from about 1 to about 24 hours. The preferred reaction time is about 18 hours. (Step D.)

The foregoing step produces a 1,2,3,4-tetrahydrocarbazol-4-one oxime tosylate (VIII) which, in turn, can be dissolved in an aromatic solvent such as benzene, or the like, and then adsorbed on a chromatographic column containing neutral alumina (usually about 40 to about 100 times the weight of the oxime tosylate) which has been previously deactivated by the addition of about 1 weight percent water. Thereafter, the chromatographic column can be eluted with chloroform or chloroform-methanol mixtures to give a 3,4,5,6-tetrahydroazepino [3,2-b]indol-2(1H)-one (IX). (Step E.)

A solution of the lactam IX obtained in Step E in diethyl ether, tetrahydrofuran, dioxane, or the like, can be heated with lithium aluminum hydride at a temperature in the range from about 34° C. to about 100° C., preferably at about the reflux temperature of the employed solvent, and in an inert atmosphere, for a time period of from about 6 to about 24 hours, preferably for about 18 hours. The product derived from this process step is a 1,2,3,4,5,6 - hexahydroazepino[3,2 - b]indole (X), unsubstituted in the 1- and 6-positions. (Step F.)

An alkanoyl substitution in the 1-position of product X can be achieved by reacting this product with an alkanoyl halide or an alkanoic anhydride at a temperature in the range from about 0° C. to about 50° C. and preferably from about 0° C. to about 25° C., for a time period from about 2 to about 24 hours, and preferably from about 8 to about 18 hours. A solvent such as benzene, pyridine, or the like, can be employed; the use of a solvent is optional, however. The produced compound is a 1-alkanoyl-1,2,3,4, 5,6-hexahydroazepino[3,2-b]indole (XI). (Step G.)

The alkanoyl substituent of compound XI can be converted to the corresponding alkyl substituent by treatment with lithium aluminum hydride in the same manner as set forth in Step F. This procedure produces a 1-alkyl-1,2,3,4,5,6-hexahydroazepino[3,2-b]indole (XII). (Step H.)

In order to produce a hexahydroazepino[4,3-b]indole, the oxime VII obtained in Step C can be reacted with polyphosphoric acid so as to produce a 1,2,3,4,5,6-hexahydroazepino[4,3-b]indol-1-one (XIII). The reaction can be achieved by admixing the oxime VII with polyphosphoric acid and heating the resulting admixture in an inert atmosphere, such as nitrogen, argon, or the like, for a time period of from about 5 to about 30 minutes, preferably from about 10 to about 15 minutes, at a temperature in the range from about 100° C. to about 115° C. (Step J.)

The lactam XIII produced in the preceding step can be converted to the corresponding 1,2,3,4,5,6-hexahydroazepino[4,3-b]indole (XIV), unsubstituted in the 2- and the 6-positions, using lithium aluminum hydride, e.g., the lactam XIII can be dissolved in a suitable solvent such as diethyl ether, tetrahydrofuran, dioxane, and the like, and heated together with lithium aluminum hydride in an inert atmosphere for a time period in the range from about 6 to about 24 hours, preferably for about 18 hours, at a temperature in the range from about 34° C. to about 100° C., and preferably at about the reflux temperature of the employed solvent. (Step K.)

An alkanoyl substitution in the 2-position of the indole XIV can be achieved by reacting indole XIV with an alkanoyl halide or an alkanoic anhydride in the same manner as set forth in Step G. The reaction product is a 2 - alkanoyl - 1,2,3,4,5,6 - hexahydroazepino[4,3-b]indole (XV). (Step L.)

The alkanoyl substituent of product XV can be converted to the corresponding alkyl substituent by treatment with lithium aluminum hydride in the same manner as set forth in Step K. The compound produced is a 2-alkyl-1,2, 3,4,5,6-hexahydroazepino[4,3-b]indole (XVI). (Step M.)

An alkyl substituent in the 6-position of compounds X, XII, XIV, and XVI can be placed by dissolving these compounds in a suitable solvent such as liquid ammonia, dimethylformamide, dimethylacetamide, or the like and reacting the compounds with a base such as sodium hydride, sodium amide, potassium amide, lithium amide, or the like, to produce the corresponding alkali metal salts which, in turn, are permitted to react in situ with the desired alkyl halide, preferably an alkyl iodide or an alkyl bromide. (Step N.) For the preparation of the corresponding 1,6-dialkyl and 2,6-dialkyl derivatives of compounds X and XIV, respectively, the sequence of the alkylation Step N vis-a-vis the acylation Steps G and L, followed by the reduction Steps H and M, respectively, is not critical. The acylation and alkylation steps can be interchanged if desired.

The compounds of this invention represented by Formulas I and II are useful for reducing anxiety and fighting behavior in animals, including mammals. In addition, these compounds can be used for normalizing hyperactive (e.g., anxiety) and depressed mental states. For purposes of administration, the compounds of this invention can be combined with solid or liquid pharmaceutical carriers and formulated in the form of tablets, powder packets, or capsules, using starch or similar excipients, or dissolved or suspended in suitable solvents or vehicles for oral or parenteral administration.

The instant compounds can also be combined and administered together with central nervous system agents such as tranquilizers, antianxiety agents, and antidepressants.

This invention is further illustrated by the following examples:

EXAMPLE I

Preparation of 3-(phenylhydrazono)cyclohexanone

A solution of phenylhydrazine (about 10.8 grams, 0.1 mole) in water (about 150 milliliters) was added dropwise and over a time period of about one hour to a stirred solution of wet 1,3-cyclohexanedione (about 16.3 grams, containing about 0.111 mole of the dione) in water (about 100 milliliters). The resulting mixture was stirred for about 10 minutes and a precipitate was observed to form.

The precipitate was recovered by filtration, washed with water, and recrystallized from ethanol-water. About 16.5 grams of a crystalline product melting at about 173.5°–197° C. (dec.) was produced. The product was identified as 3-(phenylhydrazono)-cyclohexanone, obtained in about 81.6 percent yield.

EXAMPLE II

Preparation of 1,2,3,4-tetrahydrocarbazol-4-one 3-(phenylhydrazono)cyclohexanone (about 13.8 grams, 0.0683 mole) was added to a solution of concentrated sulfuric acid (about 51 milliliters) in water (about 137 milliliters). The resulting mixture was heated to about 100° C. and maintained at this temperature and under nitrogen for about 1.5 hours. Thereafter, the hot mixture was poured into water (about 600 milliliters) and the resulting admixture was cooled in an ice bath and stirred for about 1 hour. A solid product was observed to form.

The solid product was collected by filtration, washed with water, dried, and recrystallized from methanol. About 3.45 grams of a crystalline product melting at about 223°–225° C. was recovered. The product was identified as 1,2,3,4-tetrahydrocarbazol-4-one, obtained in about 17.3 percent yield.

EXAMPLE III

Preparation of 1,2,3,4-tetrahydrocarbazol-4-one oxime 1,2,3,4-tetrahydrocarbazol-4-one (about 4.50 grams, 0.0243 mole), hydroxylamine hydrochloride (about 2.53 grams, 0.0364 mole), sodium acetate (about 2.98 grams, 0.0364 mole), ethanol (about 84 milliliters), and water (about 21 milliliters) were admixed and refluxed under nitrogen for about 5 hours. Thereafter, the resulting admixture was cooled, concentrated by evaporation under reduced pressure, and the obtained concentrate suspended in water. A crystalline material was recovered from the suspension by filtration, washed with water, and dried under reduced pressure. About 4.7 grams of a crude product melting at about 196° C. (dec.) was obtained.

The crude was chromatographed on silica gel (about 200 grams) with 50 volume percent ethyl acetate-50 volume percent a mixture of hexanes. The product obtained in the first band eluted from the column was crystalized from ethyl acetate to yield about 3.47 grams of a crystalline material melting at about 205°–209° C. (dec.). Recrystallization several times from ethyl acetate elevated the melting point to about 208.5°–210° C. (dec.). The crystalline material was identified as 1,2,3,4-tetrahydrocarbazol-4-one oxime, obtained in about 71.3 percent yield.

*Analysis.*—Calcd. for $C_{12}H_{12}N_2O$ (percent): C, 71.98; H, 6.04. N, 13.99. Found (percent): C, 72.19; H, 6.08; N, 14.24.

EXAMPLE IV

Preparation of 1,2,3,4,5,6-hexahydroazepino[4,3-b]indol-1-one

A stirred mixture of 1,2,3,4-tetrahydrocarbazol-4-one oxime (about 2.21 grams, 11.0 millimoles) and polyphosphoric acid (about 70 grams) was heated under nitrogen in an oil bath for about 10 minutes. The oil bath was maintained at a temperature in the range from about 102°–112° C. Thereafter, the mixture was poured into a stirred mixture of ice and water (about 300 milliliters).

The polyphosphoric acid was hydrolyzed as rapidly as possible, the resulting solid was collected by filtration, and washed with water and a dilute aqueous ammonium hydroxide solution. The solid was dissolved in methanol, decolorized with activated charcoal, and then crystallized from a methanolethyl acetate solution. About 0.889 gram of a crystalline material melting at about 200°–217° C. (dec.) was produced.

The produced crystals were chromatographed on silica gel (about 50 grams) with 20 percent methanol-80 percent ethyl acetate (by volume). The eluted product was then crystallized several times from methanol and crystals melting at about 219°–220° C. (sintering at about 100° C.) were obtained. The crystals were identified as 1,2,3,4,5,6-hexahydroazepino[4,3-b]indol-1-one.

*Analysis.*—Calcd. for $C_{12}H_{12}N_2O$ (percent): C, 71.98; H, 6.04; N, 13.99. Found (percent): C, 72.25; H, 6.14; N, 13.76.

EXAMPLE V

Prepartion of 1,2,3,4,5,6-hexahydroazepino[4,3-b]indole 1,2,3,4,5,6-hexahydroazepino[4,3-b]indol-1-one (about 1 gram, 5 millimoles) was added to a stirred, ice-cold suspension of lithium aluminum hydride (about 1.5 grams) in dry tetrahydrofuran (about 150 milliliters). The resulting mixture was cooled in an ice-bath and treated successively with water (about 1.5 milliliters), a 15 weight percent aqueous sodium hydroxide solution (about 1.5 milliliters), and water (about 4.5 milliliters).

A solid material was produced and was recovered from the mixture by filtration and then washed with tetrahydrofuran. The filtrates and washings were combined and concentrated. The resulting oil was stirred with dilute acetic acid. Another solid material was observed to form and was removed by filtration. After washing and recrystallizing from methanol the removed solid was identified as the starting material, 1,2,3,4,5,6-hexahydroazepino[4,3-b]indol-1-one.

The acetic acid filtrate was cooled in an ice bath, made ammoniacal, and then saturated with sodium chloride. A solid material precipitated and was recovered by filtration, washed with water, dried, and recrystallized from methanol. About 65 milligrams of a crystalline product melting at about 193°–195° C. was produced. Several recrystallizations from methanol elevated the melting point to about 200°–202.5° C. The crystalline product was identified as 1,2,3,4,5,6-hexahydroazepino[4,3-b]indole, obtained in about 70 percent yield.

*Analysis.*—Calcd. for $C_{12}H_{14}N_2$ (percent): C, 77.38; H, 7.58; N, 15.04. Found (percent): C, 77.16; H, 7.88; N, 14.95.

Following a procedure analogous to Examples I through V but starting with a substituted phenylhydrazine, the corresponding 1,2,3,4,5,6-hexahydroazepino[4,3-b]indoles bearing substitutents in the 7-, 8-, 9-, or 10-positions can be produced. For example, (2-methylphenyl)

hydrazine yields 1,2,3,4,5,6-hexahydro-7-methylazepino [4,3-b]indole; (3-ethylphenyl)hydrazine yields a mixture of 1,2,3,4,5,6-hexahydro-8-ethylazepino[4,3-b]indole and 1,2,3,4,5,6-hexahydro-10-ethylazepino[4,3-b]indole which can be separated by chromatography; (4-propylphenyl) hydrazine yields 1,2,3,4,5,6-hexahydro-9-propylazepino [4,3-b]indole.

Similarly, (2-isopropoxyphenyl)hydrazine yields 1,2,3, 4,5,6 - hexahydro - 7 - isopropoxyazepino[4,3-b]indole; (4 - methoxyphenyl)hydrazine yields 1,2,3,4,5,6-hexahydro - 9 - methoxyazepino[4,3-b]indole; (3-ethoxyphenyl) hydrazine yields a mixture of 1,2,3,4,5,6 - hexahydro-8-ethoxyazepino[4,3-b]indole and 1,2,3,4,5,6-hexahydro-10-ethoxyazepino[4,3-b]indole which can be separated by chromatography.

By the same token, (2-chlorophenyl)hydrazine yields 1,2,3,4,5,6 - hexahydro - 7 - chloroazepino[4,3-b]indole; (3-fluorophenyl)hydrazine yields a mixture of 1,2,3,4,5,6-hexahydro-8-fluoroazepino[4,3-b]indole and 1,2,3,4,5,6-hexahydro-10-fluoroazepino[4,3-b]indole which can be separated by chromatography; (4-bromophenyl)hydrazine yields 1,2,3,4,5,6-hexahydro - 9 - bromoazepino[4,3-b]indole; (4-chlorophenyl)hydrazine yields 1,2,3,4,5,6-hexahydro-9-chloroazepino[4,3-b]indole.

EXAMPLE VI

Preparation of 1,2,3,4,5,6-hexahydro-2-formylazepino [4,3-b]indole 1,2,3,4,5,6 - hexahydroazepino[4,3-b]indole (about 4 grams, 0.0215 mole) was added to an ice-cold solution of acetic anhydride (about 6.43 milliliters) and 97 weight percent formic acid (about 2.72 milliliters). The resulting mixture was allowed to stand at about 25° C. and under nitrogen for about 18 hours, and then poured into water. A gum initially separated from the mixture and then crystallized. The resulting crystals were collected by filtration, washed with water, and dried. About 4.56 grams of crude product was obtained.

The crude product was recrystallized from methylene chloride-methanol and about 2.79 grams of a crystalline product melting at about 158°–160° C. was obtained. Further recrystallization from methylene chloride-methanol raised the melting point to about 160°–161° C. The crystalline product was identified as 1,2,3,4,5,6-hexahydro-2-formylazepino[4,3-b]indole, obtained in about 60.6 percent yield.

Analysis.—Calcd. for $C_{13}H_{14}N_2O$ (percent): C, 72.87; H, 6.59; N, 13.08. Found (percent): C, 71.94; H, 6.62; N, 13.41.

Similarly, using propionic anhydride, 1,2,3,4,5,6-hexahydro-2-propionylazepino[4,3-b]indole can be prepared; using acetic anhydride, 1,2,3,4,5,6-hexahydro-2-acetylazepino[4,3-b]indole can be prepared.

EXAMPLE VII

Preparation of 1,2,3,4,5,6-hexahydro-2-methylazepino [4,3-b]indole 1,2,3,4,5,6 - hexahydro-2-formylazepino[4,3-b] indole (about 2.38 grams, 0.011 mole) was added, under nitrogen, to a stirred, ice-cold suspension of lithium aluminum hydride (about 2.5 grams) in dry tetrahydrofuran (about 250 milliliters). The resulting mixture was refluxed under nitrogen for about 18 hours, cooled in an ice bath and then treated successively with water (about 2.5 milliliters), 15 weight percent aqueous sodium hydroxide solution (about 2.5 milliliters), and water (about 7.5 milliliters). Thereafter, the resulting mixture was filtered and the filtrate concentrated by evaporation under reduced pressure. The obtained residue was crystallized from a mixture of ethyl acetate and mixed hexanes, to give two crops of a crystalline product—about 1.71 grams melting at about 167°–168.5° C. and about 0.147 gram melting at about 165.5°–167° C. Additional crystallization from ethyl acetate raised the melting point to about 168.5°–170° C. The crystalline product was identified as 1,2,3,4,5,6-hexahydro-2-methylazepino[4,3-b]indole obtained in about 83.8 percent yield.

Analysis.—Calcd. for $C_{13}H_{16}N_2$ (percent): C, 77.96; H, 8.05; N, 13.99. Found (percent): C, 78.01; H, 8.28; N, 14.25.

In a manner analogous to Example VII, 1,2,3,4,5,6-hexahydro-2-propylazepino[4,3-b]indole can be derived from 1,2,3,4,5,6-hexahydro - 2 - propionylazepino[4,3-b] indole; 1,2,3,4,5,6-hexahydro-2-ethylazepino[4,3-b] can be derived from 1,2,3,4,5,6-hexahydro - 2 - acetylazepino [4,3-b]indole.

EXAMPLE VIII

Preparation of 1,2,3,4-tetrahydrocarbazol-4-one oxime tosylate

A stirred solution of 1,2,3,4-tetrahydrocarbazol-4-one oxime (about 100 grams, 0.5 mole) in dry pyridine (about 2 liters) was cooled in an ice bath to a temperature of about 4° C. Thereafter, p-toluenesulfonyl chloride (about 105 grams, 0.55 mole) was added thereto. The resulting mixture was permitted to warm to room temperature and to stand for about 18 hours under nitrogen. Afterward, the mixture was poured into ice water (about 6 liters) and extracted with methylene chloride.

The obtained methylene chloride extract was washed with water and brine, dried over anhydrous magnesium sulfate, and concentrated by evaporation under reduced pressure. The resulting residue was treated with toluene, concentrated by evaporation, then treated with benzene, and again concentrated by evaporation. Thereafter, the residue was dissolved in ethyl acetate, decolorized with activated charcoal, and the solvent evaporated from the prepared solution under reduced pressure and using a rotating evaporator. About 124.8 grams of a crystalline product melting at about 135°–138° C. (dec.) and about 10.6 grams of a crystalline product melting at about 158°–160° C. (dec.) were obtained. The crystalline product was identified as 1,2,3,4-tetrahydrocarbazol-4-one oxime tosylate.

EXAMPLE IX

Preparation of 3,4,5,6-tetrahydroazepino[3,2-b]indol-2(1H)-one

The tosylate prepared in Example VIII, supra, (about 135.4 grams) was dissolved in benzene (about 8 liters) and was adsorbed on a column of neutral alumina (about 5.3 kilograms) which had been previously deactivated with about 1 weight percent water. (The column was prepared by pouring dry alumina into a chromatographic column filled with mixed hexanes.) The column was developed with benzene (about 10 liters), and a product was eluted from the column with chloroform (about 25 liters). The product was crystallized from methanol-ethyl acetate, and about 31.1 grams of a crystalline material melting at about 243°–244° C. was obtained. An additional recrystallization from methanol-ethyl acetate raised the melting point to about 243.5°–246° C. The crystalline material was identified as 3,4,5,6-tetrahydroazepino[3,2-b]indol-2(1H)-one. The overall yield, based on the 1,2,3,4-tetrahydrocarbazol-4-one oxime used in Example VIII, was found to be about 31.1 percent.

Analysis.—Calcd for $C_{12}H_{12}N_2O$ (percent): C, 71.98; H, 6.04; N, 13.99. Found (percent): C, 71.78; H, 6.13; N, 13.83.

EXAMPLE X

Preparation of 1,2,3,4,5,6-hexahydroazepino[3,2-b]indole

To a stirred, ice-cold suspension of lithium aluminum hydride (about 1.0 gram) in dry tetrahydrofuran (about 100 milliliters) maintained under nitrogen was added 3,4,5,6 - tetrahydroazepino[3,2-b]indol-2(1H)-one (about 1 gram, 0.005 mole). The resulting mixture was refluxed for about 8 hours and then cooled in an ice bath to a temperature of about 4° C. Thereafter, the mixture was treated successively with water (about 1 milliliter), a 15 weight percent aqueous sodium hydroxide solution (about 1 milliliter), and water (about 3 milliliters). The produced admixture was then stirred for about one hour and thereafter filtered. Upon concentration of the filtrate by evaporation under reduced pressure, a white, crystalline residue was produced. The residue was recrystallized from ethyl acetate. About 0.569 gram of a crystalline product melting at about 175°–178° C. (dec.) with sintering at about 167° C. was obtained. Two additional recrystallizations from diethyl ether yielded crystals melting at about 153°–180° C. (dec.). The crystalline product was identified at 1,2,3,4,5,6 - hexahydroazepino[3,2-b]indole, obtained in about 61.2 percent yield.

*Analysis.*—Calcd. for $C_{12}H_{14}N_2$ (percent): C, 77.38; H, 7.58; N, 15.04. Found (percent): C, 77.08; H, 7.33; N, 15.28.

Following a procedure analogous to Examples I through III and VIII through X but starting with a substituted phenylhydrazine, the corresponding 1,2,3,4,5,6-hexahydroazepino[3,2-b]indoles bearing substituents in the 7-, 8-, 9-, or 10-positions can be produced. For example, (2-methylphenyl)hydrazine yields 1,2,3,4,5,6-hexahydro-7-methylazepino[3,2-b]indole; (3 - ethylphenyl)hydrazine yields a mixture of 1,2,3,4,5,6-hexahydro-8-ethylazepino[3,2-b]indole and 1,2,3,4,5,6-hexahydro-10-ethylazepino[3,2-b]indole which can be separated by chromatography; (4-propylphenyl)hydrazine yields 1,2,3,4,5,6-hexahydro-9-propylazepino[3,2-b]indole.

Similarly, (2-isopropoxyphenyl)hydrazine yields 1,2,3,4,5,6 - hexahydro-7-isopropoxyazepino[3,2-b]indole; (4-methoxyphenyl)hydrazine yields 1,2,3,4,5,6-hexahydro-9-methoxyazepino[3,2-b]indole; (3-ethoxyphenyl)hydrazine yields a mixture of 1,2,3,4,5,6-hexahydro-8-ethoxyazepino[3,2-b]indole and 1,2,3,4,5,6-hexahydro-10-ethoxyazepino[3,2-b]indole which can be separated by chromatography.

By the same token, (2-chlorophenyl)hydrazine yields 1,2,3,4,5,6 - hexahydro-7-chloroazepino[3,2-b]indole; (3-fluorophenyl)hydrazine yields a mixture of 1,2,3,4,5,6-hexahydro-8-fluoroazepino[3,2-b]indole and 1,2,3,4,5,6-hexahydro-10-fluoroazepino[3,2-b]indole which can be separated by chromatography; (4-bromophenyl)hydrazine yields 1,2,3,4,5,6 - hexahydro-9-bromoazepino[3,2-b]indole; (4-chlorophenyl)hydrazine yields 1,2,3,4,5,6-hexahydro-9-chloroazepino[3,2-b]indole.

EXAMPLE XI

Preparation of 1,2,3,4,5,6-hexahydro-6-methylazepino[4,3-b]indole and the hydrochloride thereof To an ice-cold, stirred solution of 1,2,3,4,5,6-hexahydroazepino[4,3-b]indole (about 3.73 grams, 0.02 mole) in about 200 milliliters of dry dimethylformamide is added, in a nitrogen atmosphere, about 0.960 gram of a 55 percent suspension of sodium hydride in mineral oil (0.022 mole of sodium hydride). This mixture is allowed to warm to about 25° C. and stand for about 2 hours. It is then cooled in an ice bath and treated during about 30 minutes with a solution of methyl iodide (about 1.37 milliliters, 0.022 mole) in about 25 milliliters of diethyl ether. The resulting solution is allowed to stand for about 18 hours at about 25° C. It is then concentrated under reduced pressure to about 50 milliliters and poured into water. The mixture is extracted several times with diethyl ether, the obtained ether extracts combined, washed with brine, dried over anhydrous potassium carbonate, and then concentrated under reduced pressure to give 1,2,3,4,5,6-hexahydro-6-methylazepino[4,3-b]indole as a residue.

This residue is redissolved in ethyl acetate and acidified with methanolic hydrogen chloride and the resulting salt is crystallized from methanol-ethyl acetate to give 1,2,3,4,5,6 - hexahydro-6-methylazepino[4,3-b]indole hydrochloride.

EXAMPLE XII

Preparation of 1,2,3,4,5,6-hexahydro-6-ethylazepino[3,2-b]indole hydrochloride

A cold solution of about 7.45 grams of 1,2,3,4,5,6-hexahydroazepino[3,2-b]indole in about 400 milliliters of dry dimethylformamide under a nitrogen atmosphere is treated with about 1.92 grams of a 55 percent suspension of sodium hydride in mineral oil. The mixture is stirred at room temperature for about 3 hours, then cooled and treated with a solution of about 3.54 milliliters of ethyl iodide in about 50 milliliters of diethyl ether. The addition takes place over a period of about 15 minutes. The mixture is then stirred at room temperature for about 18 hours and then concentrated under reduced pressure to a residue which is dissolved in about 250 milliliters of water. The obtained aqueous mixture is extracted several times with diethyl ether and then several times with methylene chloride. The two extracts are worked separately, that is, washed with brine, then water, and finally dried over anhydrous potassium carbonate. Thereafter, the two extracts are combined and concentrated to a residue which is suspended on about 30 grams of silica gel and chromatographed over about 450 grams of silica gel using 2 volume percent ethylamine-48 volume percent methanol-50 volume percent ethyl acetate or elution. Fractions of about 150 milliliters are collected. The fractions containing the product are combined and concentrated under reduced pressure to a residue which is then dissolved in ethyl acetate, cooled, and acidified with methanolic hydrogen chloride. The precipitate which results is collected by filtration, washed with ethyl acetate and dried in vacuo to yield, after recrystallization from methanol and then from methanol-ethyl acetate, 1,2,3,4,5,6-hexahydro-6-ethylazepino[3,2-b]indole hydrochloride.

EXAMPLE XIII

Preparation of 1,2,3,4,5,6-hexahydro-1-acetylazepino[3,2-b]indole

To a stirred, ice-cold solution of acetic anhydride (about 2 milliliters) in pyridine (about 50 milliliters) was added 1,2,3,4,5,6-hexahydroazepino[3,2-b]indole (about 1 gram, 5.38 millimoles). The resulting mixture was then permitted to warm to about room temperature and to stand for about 18 hours. Thereafter, the obtained mixture was poured into water and concentrated by evaporation under reduced pressure and at a temperature of about 20° to 30° C.

A solid product was obtained and was recovered by filtration, washed with water, dried, and recrystallized from methanol-ethyl acetate. About 1.144 grams of a crystalline product melting at about 217.5° to 218.5° C. was obtained. A second recrystallization from methanol-ethyl acetate did not change the melting point. The product was identified as 1,2,3,4,5,6-hexahydro-1-acetylazepino[3,2-b]indole, obtained in about 93 percent yield.

*Analysis.*—Calcd. for $C_{14}H_{16}N_2O$ (percent): C, 73.65; H, 7.06; N, 12.27. Found (percent): C, 73.53; H, 7.14; N, 11.99.

EXAMPLE XIV

Preparation of 1,2,3,4,5,6-hexahydro-1-ethylazepino[3,2-b]indole

To a refluxing solution of lithium aluminum hydride (about 1 gram) in tetrahydrofuran (about 75 milliliters) maintained under an atmosphere of nitrogen was added a solution of 1,2,3,4,5,6-hexahydro-1-acetylazepino[3,2-b]indole (about 1 gram, 0.00438 mole) in tetrahydrofuran (about 25 milliliters). The resulting mixture was then refluxed for about 18 hours.

The refluxed mixture was thereafter cooled in an ice bath and water (about 1 milliliter), an aqueous 15 weight percent sodium hydroxide solution (about 1 milliliter), and more water (about 3 milliliters) was successively added thereto. The obtained admixture was then stirred at about room temperature for about 1 hour and filtered.

The filtrate was concentrated by evaporation under reduced pressure, and the produced residue was recrystallized from ethyl acetate-mixed hexanes. Two crops of crystals—about 0.431 gram melting at about 125.5° to 128° C. and about 0.244 gram melting at about 124° to 125° C. were obtained. An aliquot of the crystals recrystallized three times from diethyl ether-mixed hexanes was found to have a melting point of about 128° to 129.5° C.

The crystals were identified as 1,2,3,4,5,6-hexahydro-1-ethylazepino[3,2-b]indole, obtained in about 72 percent yield.

*Analysis.*—Calcd. for $C_{14}H_{18}N_2$ (percent): C, 78.46; H, 8.47; N, 13.07. Found (percent): C, 78.08; H, 8.68; N, 13.17.

Following the procedure set forth in Example XII, the prepared 1,2,3,4,5,6 - hexahydro-1-ethylazepino[3,2-b]indole can be reacted with ethyl iodide to produce 1,2,3,4,5,6-hexahydro-1,6-diethylazepino[3,2-b]indole.

I claim:

1. A hexahydroazepinoindole which is a member of the group consisting of a 1,2,3,4,5,6-hexahydroazepino[4,3-b]indole represented by the formula

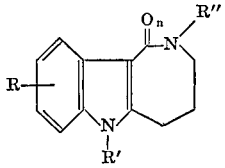

and a 1,2,3,4,5,6-hexahydroazepino[3,2-b]indole represented by the formula

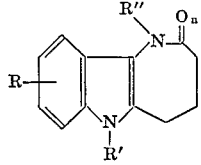

wherein R is a member of the group consisting of hydrogen, alkyl, alkoxy, and halo radicals, R' is a member of the group consisting of hydrogen and alkyl radicals, R" is a member of the group consisting of hydrogen, alkyl, and alyanoyl radicals, and $n$ is an integer having a value of zero or 1, with the provisos that the foregoing alkyl, alkoxy, or alkanoyl radicals contain from 1 to 3 carbon atoms, inclusive, and that R' and R" are both hydrogen when $n$ is 1; and the corresponding acid addition salts thereof.

2. A 1,2,3,4,5,6-hexahydroazepino[4,3-b]indole represented by the formula

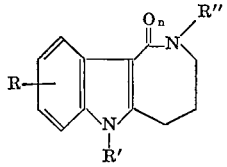

wherein R is a member of the group consisting of hydrogen, alkyl, alkoxy, and halo radicals, R' is a member of the group consisting of hydrogen and alkyl radicals, R" is a member of the group consisting of hydrogen, alkyl, and alkanoyl radicals, and $n$ is an integer having a value of zero or 1, with the provisos that the foregoing alkyl, alkoxy or alkanoyl radicals contain from 1 to 3 carbon atoms, inclusive, and that R' and R" are both hydrogen when $n$ is 1; and the corresponding acid addition salts thereof.

3. The hexahydroazepinoindole in accordance with claim 2 wherein R is hydrogen, R' is hydrogen, R" is hydrogen, and $n$ has a value of 1.

4. The hexahydroazepinoindole in accordance with claim 2 wherein R is hydrogen, R' is hydrogen, R" is hydrogen, and $n$ has a value of zero.

5. The hexahydroazepinoindole in accordance with claim 2 wherein R is hydrogen, R' is hydrogen, R" is formyl, and $n$ has a value of zero.

6. The hexahydroazepinoindole in accordance with claim 2 wherein R is hydrogen, R' is hydrogen, R" is methyl, and $n$ has a value of zero.

7. A 1,2,3,4,5,6-hexahydroazepino[3,2-b]indole represented by the formula

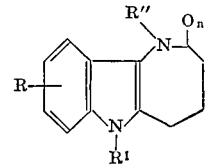

wherein R is a member of the group consisting of hydrogen, alkyl, alkoxy, and halo radicals, R' is a member of the group consisting of hydrogen and alkyl radicals, R" is a member of the group consisting of hydrogen, alkyl and alkanoyl radicals, and $n$ is an integer having a value of zero or 1, with the provisos that the foregoing alkyl, alkoxy, or alkanoyl radicals contain from 1 to 3 carbon atoms, inclusive, and that R' and R" are both hydrogen when $n$ is 1; and the corresponding acid addition salts thereof.

8. The hexahydroazepinoindole in accordance with claim 7 wherein R is hydrogen, R' is hydrogen, R" is hydrogen, and $n$ has a value of 1.

9. The hexahydroazepinoindole in accordance with claim 7 wherein R is hydrogen, R' is hydrogen, R" is hydrogen, and $n$ has a value of zero.

10. The hexahydroazepinoindole in accordance with claim 7 wherein R is hydrogen, R' is hydrogen, R" is acetyl, and $n$ has a value of zero.

11. The hexahydroazepinoindole in accordance with claim 7 wherein R is hydrogen, R' is hydrogen, R" is ethyl, and $n$ has a value of zero.

References Cited

Pearson and Ball: "J. Org. Chem.," vol. 14, pp. 118–131 (1949).

Fieser et al.: "Advanced Organic Chemistry," pp. 431–438 (Reinhold) (1961).

Teuber et al.: Leibigs Ann. der Chemie, vol. 696, pp. 116–35, August 1966.

HENRY R. JILES, Primary Examiner

R. T. BOND, Assistant Examiner

U.S. Cl. X.R.

260—326.3, 326.5, 326.9; 424—274

UNITED STATES PATENT OFFICE
CERTIFICATE OF CORRECTION

Patent No. 3,563,979      Dated February 16, 1971

Inventor(s) Jackson B. Hester, Jr.

It is certified that error appears in the above-identified patent and that said Letters Patent are hereby corrected as shown below:

Column 3, line 16, for "R'''H" read -- R'''X --. Column line 67, for "70 percent" read -- 7 percent --. Column 8, line 9, for "[4,3-b] can" read -- [4,3-b]indole can --. Column 8, lines 66 to 69, for "EXAMPLE X  To a stirred, ice-cold suspension of lithium aluminum Preparation of 1,2,3,4,5, hexahydroazepino[3,2-b]indole hydride (about 1.0 gram)" read -- EXAMPLE X  Preparation of 1,2,3,4,5,6-hexahydroazepino[3,2 indole To a stirred, ice-cold suspension of lithium aluminum hydride (about 1.0 gram) --.

Signed and sealed this 24th day of August 1971.

(SEAL)
Attest:

EDWARD M. FLETCHER, JR.          WILLIAM E. SCHUYLER, JR.
Attesting Officer                Commissioner of Patents